(12) United States Patent
Hairston et al.

(10) Patent No.: US 11,558,574 B2
(45) Date of Patent: Jan. 17, 2023

(54) INTERLEAVED SIMULTANEOUS BINNING MODE

(71) Applicant: BAE SYSTEMS Information and Electronic Systems Integration Inc., Nashua, NH (US)

(72) Inventors: Allen W. Hairston, Andover, MA (US); Thomas E. Collins, III, Tyngsboro, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 165 days.

(21) Appl. No.: 17/120,782

(22) Filed: Dec. 14, 2020

(65) Prior Publication Data

US 2022/0191408 A1 Jun. 16, 2022

(51) Int. Cl.
| | |
|---|---|
| *H04N 5/365* | (2011.01) |
| *H04N 5/3745* | (2011.01) |
| *H04N 5/378* | (2011.01) |
| *H04N 5/33* | (2006.01) |
| *H04N 5/347* | (2011.01) |

(52) U.S. Cl.
CPC ............... *H04N 5/378* (2013.01); *H04N 5/33* (2013.01); *H04N 5/347* (2013.01); *H04N 5/3651* (2013.01)

(58) Field of Classification Search
None
See application file for complete search history.

(56) References Cited

U.S. PATENT DOCUMENTS

| | | | | |
|---|---|---|---|---|
| 8,174,587 | B2 * | 5/2012 | Fukuhara | H04N 19/63 348/222.1 |
| 2007/0263099 | A1 * | 11/2007 | Motta | H04N 5/2354 348/222.1 |
| 2014/0263964 | A1 * | 9/2014 | Yang | H04N 5/37457 250/208.1 |

* cited by examiner

*Primary Examiner* — Mark T Monk
(74) *Attorney, Agent, or Firm* — Maine Cernota & Rardin; Gary McFaline (57) ABSTRACT

A system for providing high resolution image output for pilotage and two color operation for threat detection is disclosed. The system comprises a focal plane array comprising a plurality of pixels arranged into groups of equal numbers, wherein each pixel comprises at least two detectors for receiving electromagnetic energy and a readout integrated circuit.

19 Claims, 11 Drawing Sheets
(4 of 11 Drawing Sheet(s) Filed in Color)

INTERLEAVED SIMULTANEOUS BINNING MODE

STATEMENT OF GOVERNMENT INTEREST

This invention was made with government support under Contract No. SCEC-PLA-0002, awarded by the U.S. Army. The United States Government has certain rights in the inventions.

FIELD OF THE DISCLOSURE

The following disclosure relates generally to imaging devices and, more specifically, to simultaneous high resolution image output and two color operation.

BACKGROUND

Digital detection of visual and infrared (IR) images is a very widely used technology, having applications ranging from consumer-oriented cameras and video apparatuses to law enforcement and military equipment. For virtually all of these applications, there is a growing demand for higher image pixel counts, higher pixel density, increased sensitivity, improved dynamic range, lower power consumption, faster image processing, and the ability to switch between modes offering different balances of these characteristics, dependent on the requirements present at a given time.

At the heart of all digital imaging systems, which may be referred to generally as Solid State Area Array Imaging Devices (SSAAIDs), is the Focal Plane Array ("FPA"), which is a two-dimensional array of elements upon which an image is focused, whereby each of the FPA elements or "pixels" develops an analog output "signal charge" that is proportional to the intensity of the electromagnetic radiation that is impinging on it after a given interval of time. This signal charge can then be stored, measured, and used to produce an image.

Figure 1:
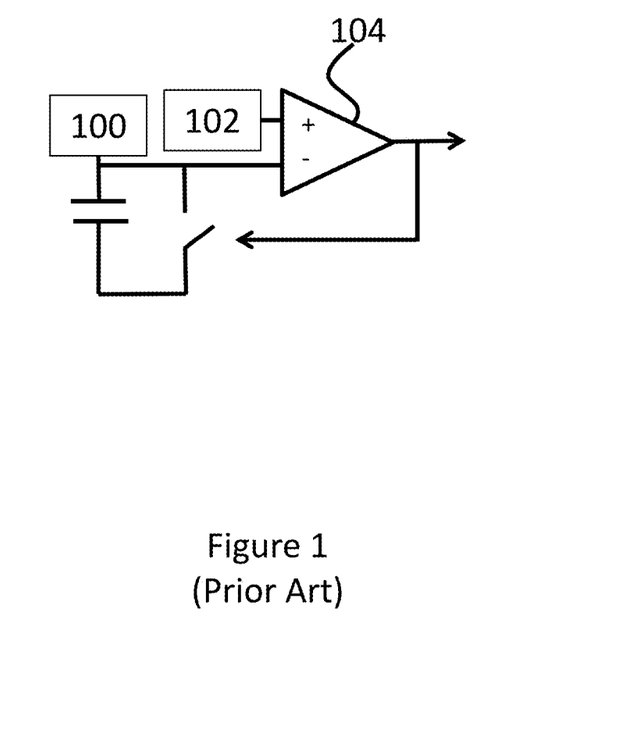
FIG. 1 is a block diagram illustrating a prior art readout integrated circuit.

The storage and measurement of the electromagnetic radiation that has impinged on a pixel over a given amount of time is accomplished using a Read-Out Integrated Circuit (ROIC). Some existing digital pixel Read-Out Integrated Circuits (ROICs), such as that shown in FIG. 1, use counter latches for both storage and readout of data, preventing simultaneous readout and integration. This reduces the time available for both integration and readout, reducing sensitivity and increasing required data rates for moving information off of the chip, respectively.

Furthermore, some existing digital pixel ROICs use counter laches for coarse conversion only. Coarse conversion only limits dynamic range and resolution while increasing power. While adding a separate fine conversion counter would allow counter laches to be used for both coarse and fine conversions, this would also increase pixel size and/or the number of ROIC layers when using traditional counter laches. While these issues might be mitigated through the use of stacked digital layers, this would result in significantly more expensive fabrication and assembly processes. Moving to a smaller geometry (e.g. a 14 nm process) might mitigate such issues, but would also be very expensive.

Still further, attempts to support simultaneous, dual-mode operation, for example, the ability to support a high-resolution mode for pilotage and a two-color mode for threat detection simultaneously, is not possible for smaller pixel sizes using the aforementioned current systems and techniques, including stacking of layers. This is, in part, due to the counters used in current pixel and FPA designs not being able to handle the additional information and rolling over, leading to uncertainty in the signal magnitude.

What is needed, therefore, are systems and methods for enabling simultaneous, high-resolution image output and two-color operation that are scalable down to relatively small pixel sizes.

SUMMARY

A two stage analog to digital conversion which uses coarse and fine residue conversion gives higher dynamic range. Using the same counter for both conversions and storing data in more compact SRAM latches enables this high dynamic range in a smaller pixel area. By interleaving full resolution and binned resolution operation, high-resolution image output and two-color operation that is scalable down to relatively small pixel sizes is achieved. A binned resolution pixel area allows simultaneous two color integration and also higher dynamic range.

In embodiments, cascading digital counters are used in combination with a digital pixel ROIC to achieve a very high dynamic range suitable for simultaneous, dual mode usage, such as simultaneously supporting a high-resolution mode, which may be suitable for pilotage, and a relatively lower-resolution mode, such as a two-color mode, which could be used for threat detection.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

As a preliminary matter, the terms LW, MW, N/C, I2F, iDSV, and pseudo-simultaneous are used herein. To avoid any ambiguity, these acronyms are defined, below.

More specifically, LW refers to "Long Wave" and "MW" refers to "Medium Wave." Where LW and MW are used, this should be understood to refer, generally, to a first and second color that the detector of embodiments is configured to detect. More specifically, LW and MW are used since these terms are commonly used to describe forms of Infrared (IR) emissions that are often the wavelengths detected and used for guidance by remotely piloted vehicles, providing a practical example without intending to be limited thereto.

N/C means "Not Connected".

I2F stands for "current to frequency converter" and should be understood to refer to a circuit that converts current into a series of pulses whose frequency is proportional to the current input; such a circuit may be used as part of an analog to digital converter (ADC). A design used in embodiments of the present disclosure contains a bidirectional input and uses an integrator configured to automatically reset on reaching a certain threshold to generate pulses.

iDSV refers to Insulated Deep Silicon Via (iDSV), which may also be referred to as a Through Silicon Via (TSV), with iDSV being the term preferred by Tower Semiconductor. Either term, as used herein, refers to a very small hole in the silicon that is filled with an insulated conductor that can be used to create vertical connections between bonded silicon layers. An iDSV or TSV is commonly created in a very thin silicon layer that can be attached to another silicon layer, creating a connection between the two layers, from the top layer iDSV to the bottom layer top metal layer.

Pseudo-simultaneous should be understood to refer to a mode of integration involving the operation of a bias selectable photodetector with positive bias and negative bias binning and interleaving those modes of operation while continuing to integrate without having to read out. In embodiments, the positive and negative bias photocurrents are integrated separately. A bias selectable detector is one whose spectral bandpass is a function of bias polarity, therefore the pseudo-simultaneous integration creates outputs from two different spectral bands whose integration start to stop times have a high degree of overlap.

Lastly, two types of two-color detectors, in embodiments, photodetectors 130, are discussed herein; the two types of two-color detectors are bias-selectable and simultaneous. A bias-selectable, two-color detector's color selection depends on its bias. More specifically, a positive bias causes the detector to sense one color while a negative bias results in the detector being sensitive to a different color. This type of detector, in embodiments, has only one connection between itself and the ROIC (100/102) of a given pixel. The detector common 104, in embodiments, is connected to the ROIC (100/102) on the periphery and the connection to the detector is made internally in the detector array.

The second type of detector, in embodiments a photodetector 130, is a simultaneous, two-color detector that comprises two detectors and two detector connections per pixel with which it is associated. Where such a detector is used, the pixel ROIC (100/102) of embodiments comprises a switch 140 configured to select one of the two-colors if the detector is not capable of integrating both colors at the same time with two inputs. The common connection of a simultaneous, two-color detector is, like the bias selectable case, on the periphery.

Now regarding the subject of the present disclosure, where multiple, simultaneous output of both high and low resolution images is desired, the systems and methods taught herein provide such functionality by interleaving images obtained from groups of binned photodetectors 130 and single, unbinned photodetectors 130. While this capability has a variety of uses, it will primarily be discussed in the context of video feeds used to control Unmanned Aerial Vehicles (UAVs), where it is particularly useful for enabling simultaneous high-resolution output, which can be used to pilot the aircraft remotely, while a simultaneously-output, lower-resolution mode is used for threat detection. This functionality would also be useful in other remotely-operated vehicles, autonomous and semi-autonomous vehicles, piloted vehicles, as well as many other applications.

Figure 2:
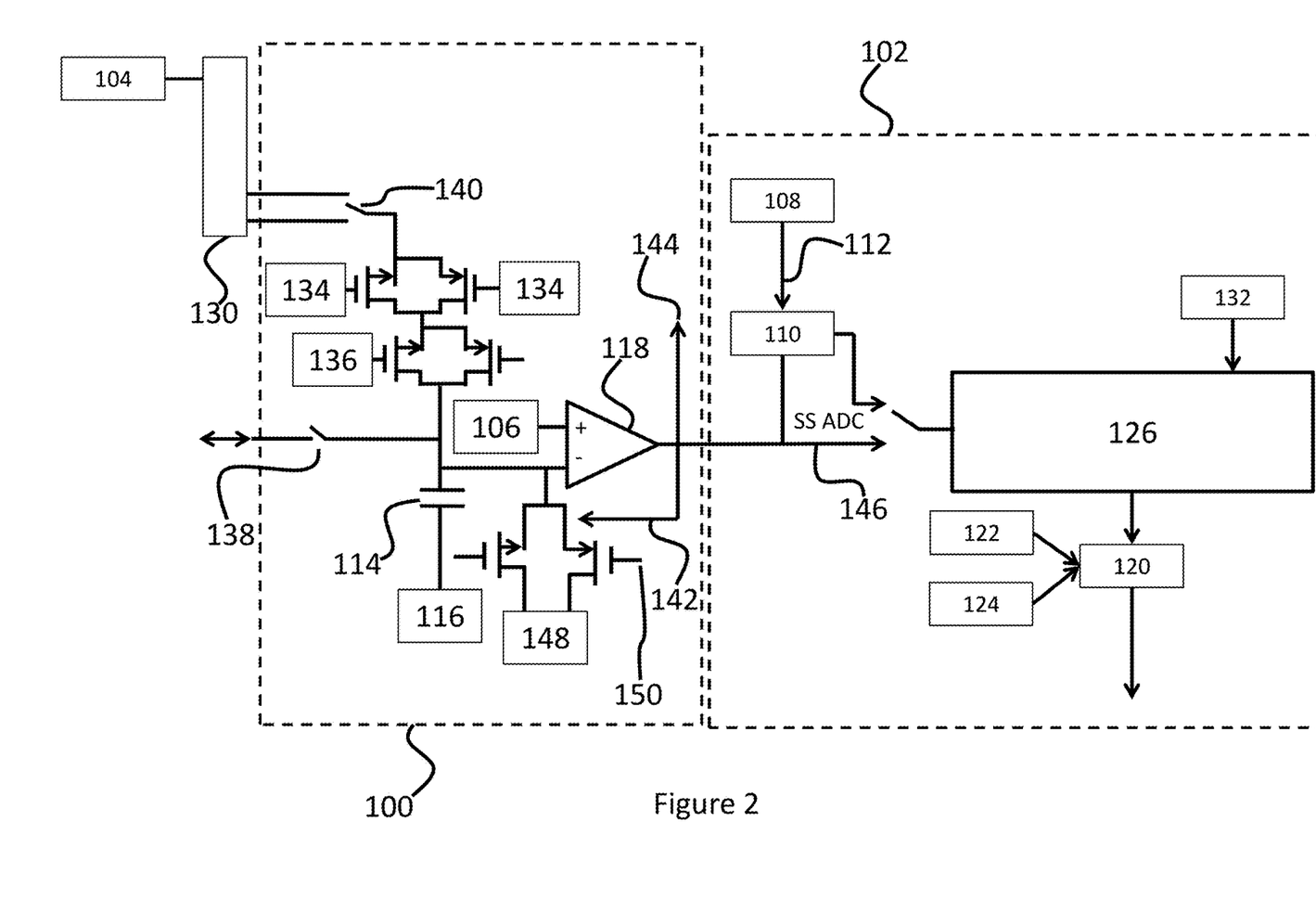
FIG. 2 is a schematic showing a pixel having a simultaneous two-color photodetector, in accordance with embodiments of the present disclosure.

Now referring to FIG. 2, FIG. 2 shows an ROIC (100/102) with analog 100 and digital 102 portions thereof highlighted, in accordance with embodiments of the present disclosure. This embodiment shows an ROIC analog pixel 100 portion and an ROIC digital pixel 102 portion. The ROIC (100/102) includes a photodetector 130 having two inputs thereto, a detector common 104, a binning selection switch 138, a readout integration capacitor 114, a comparator 118 with threshold voltage input 106, a voltage reference or ramp 116, an enable count latch 110, a global clock 108, a readout connection 112, a latch module 120 connected to a counter/latch 126, the latch module 120 having a select latch write 122 and select latch read 124 connected thereto, a counter reset 132, two integration bias transistors that are part of a bi-directional two color input circuit 134, a stop integration switch for residue conversion 136, an automatic reset 142, an event detect 144, a counter clock 146, a reset reference voltage 148 or ADC conversion reference 148 (in embodiments, an event reference 148), and a global reset clock 150 or event bias 150.

More specifically, the circuit of FIG. 2 describes a pixel that integrates using a two-stage analog to digital converter (ADC). The photodetector 130 current is integrated on the integration capacitor 114 until the comparator 118 senses that the integration voltage has exceeded the threshold voltage 106, at which point it outputs a pulse that resets the integration capacitor 114. The pulses are counted by counter 126 and latched at the end of the integration time in latch module 120. In embodiments, a single slope residue conversion is done using the same counter 126 with an external ramp and stored in latch module 120. Data is read out from latch module 120.

In embodiments, the photodetector 130 is a simultaneous, two-color photodetector 130.

In embodiments, the latch module 120 comprises SRAM.

In embodiments, the direct injection integration bias transistors that form the bi-directional, two color input circuit 134 are one NFET and one PFET allowing for integrating detector currents of either polarity. Such a bi-directional input allows use of either voltage polarity of single color photodetectors 130, since most photodetectors 130 require a specific polarity of bias and they are not all the same.

In embodiments, the ROIC (100/102) comprises a detector select switch 140, allowing for switchable, parallel, two-color conversion. In embodiments, simultaneous two-color photodetectors 130 have two connections per pixel. In such embodiments, the detector select 140 allows selection between the simultaneous two-color photodetector's 130 connections, of the same polarity.

Figure 3:
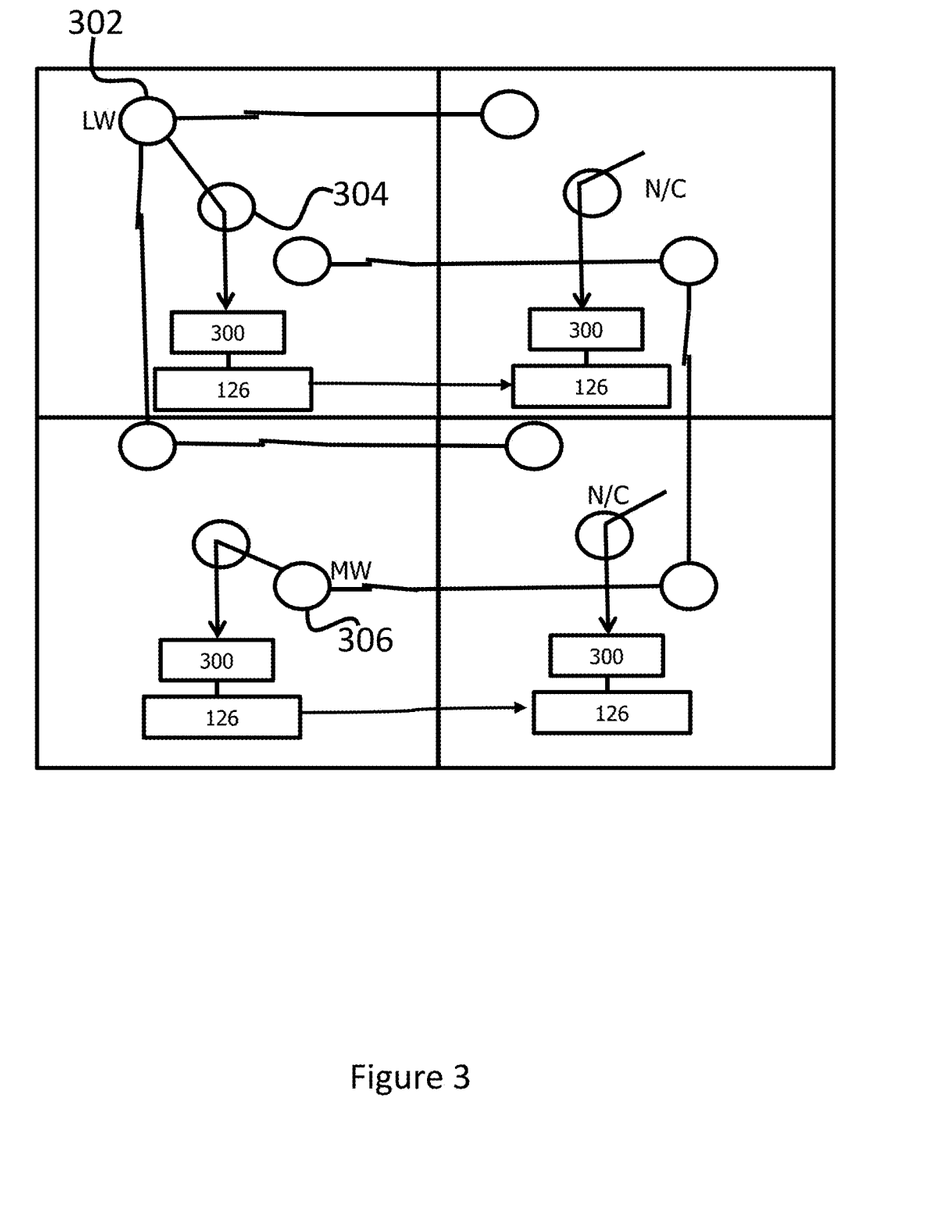
FIG. 3 is a top view of a 2×2 binned pixel configured for simultaneous two color operation, in accordance with embodiments of the present disclosure.

Now referring to FIG. 3, a top view of a 2×2 binned pixel group configured for simultaneous two-color operation, where individual pixels have the structure shown in the schematic of FIG. 2, is provided. In the binned 2×2 simultaneous two color configuration, the detectors of each color in the 2×2 bin group (302/306), in embodiments photodetectors 130, are connected together, but the two colors remain separate. This allows the 8 detectors (2 colors×4 pixels) to function as 2 detectors (2 colors for one larger pixel comprising four detectors). In embodiments, each color is connected to one of the four pixels' ROIC (100/102) through an ROIC input 304, so that all current of that color is integrated in one ROIC (100/102). Since there are two colors in the embodiment shown, two ROIC pixels are integrating simultaneously.

In FIG. 3, each pixel comprises three diagonally-aligned circles. The upper left circle represents the connection to color LW 302. The lower right circle represents the connection to color MW 306. The middle circle represents the ROIC input 304. Current leaving the ROIC (100/102) passes through a current to frequency converter (I2F) 300, which converts the current to discrete pulses, before passing that signal along to a counter 126, which counts the pulses generated by the I2F 300. By combining counters 126, the counting capacity of the system is multiplied, compared to using the pixels individually.

Now referring more specifically to the interconnections shown in FIG. 3, it can be seen that all the upper left circles in each of the 2×2 pixels (i.e. connections to color LW 302) are connected to each other and to the one ROIC input 304 of the upper left of the 2×2 for the LW input. Thus all the LW detectors 302 in the 2×2 are connected to the upper left ROIC input 304 in the 2×2. Similarly, all the lower right circuits in the 2×2 (connection to color MW 306) are connected to the one ROIC input 304 in the lower left pixel of the 2×2 bin group. The other 2 ROIC input circuits 304 in the 2×2 are not used in this configuration. Their circles are not connected to any detectors and they are labelled "N/C" for "no connect".

The digital counter circuits in the 2 ROIC pixels with unused analog inputs, in embodiments, are used to increase the digital coarse counting capability of the 2 ROIC pixels whose analog inputs are being used. This use of these counters 126 is indicated by the arrows going from the counters 126 in the left pixels to the counters 126 in the right pixels of the pixel group. These figures show additional details of the interconnection between pixels that may be binned together and also better show some of the internal connections between analog and digital portions of the ROIC (100/102) of FIG. 2.

Figure 4:
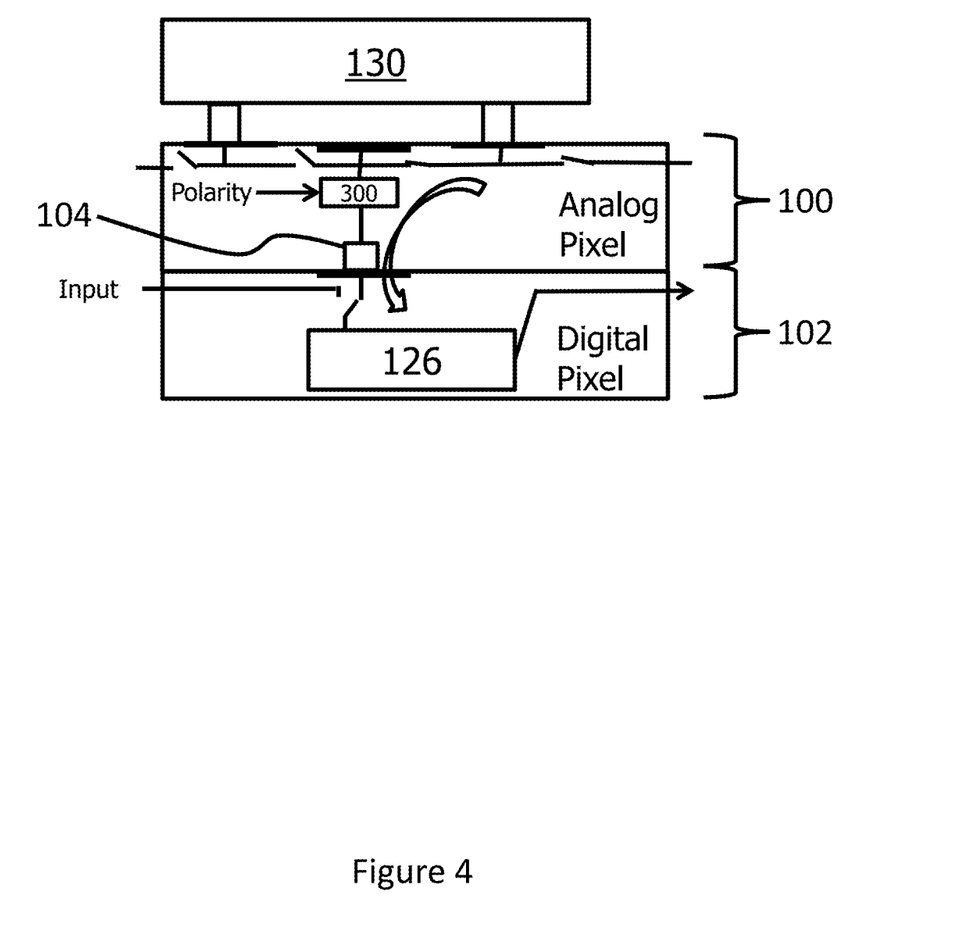
FIG. 4 is a cross sectional view of a simultaneous two color single pixel, in accordance with embodiments of the present disclosure.

FIG. 4 shows an example of how the circuit of FIG. 2 may be implemented in a relatively small pixel using Direct Bond Interconnect (DBI®) stacked silicon wafer technology, which may also be referred to as low temperature hybrid bonding. This technique involves joining dielectric regions and metal interconnect regions on each wafer, providing both mechanical support and dense electrical interconnects between a wafer pair, as would be known to one of ordinary skill in the art.

In the example of FIG. 4, the analog pixel circuitry 100 is implemented in one silicon CMOS process optimized for analog performance and the digital pixel circuitry 102 is implemented in a second silicon CMOS optimized for digital performance and high transistor density. The stacked wafer technology allows the analog pixel circuits 100 to send a digital signal to the digital pixel circuits 102 in each pixel. The iDSV 104 shown in FIG. 4 in the analog portion of the pixel 100 represents a Through Silicon Via (TSV) 104 that extends from the analog circuits 100 down to the bottom of a thinned analog wafer, making it available for connection to the metallization in the digital layer 102. Thus, the backside of the analog portion of the pixel 100 connects to the top of the digital portion of the pixel 102, creating a stacked pixel. This stacked approach allows for good analog performance from the analog front end while also allowing for the use of high density, low power digital circuits in the same pixel. In embodiments, the I2F circuit 300 contains a bidirectional input with auto-reset or event detection.

Figure 5:
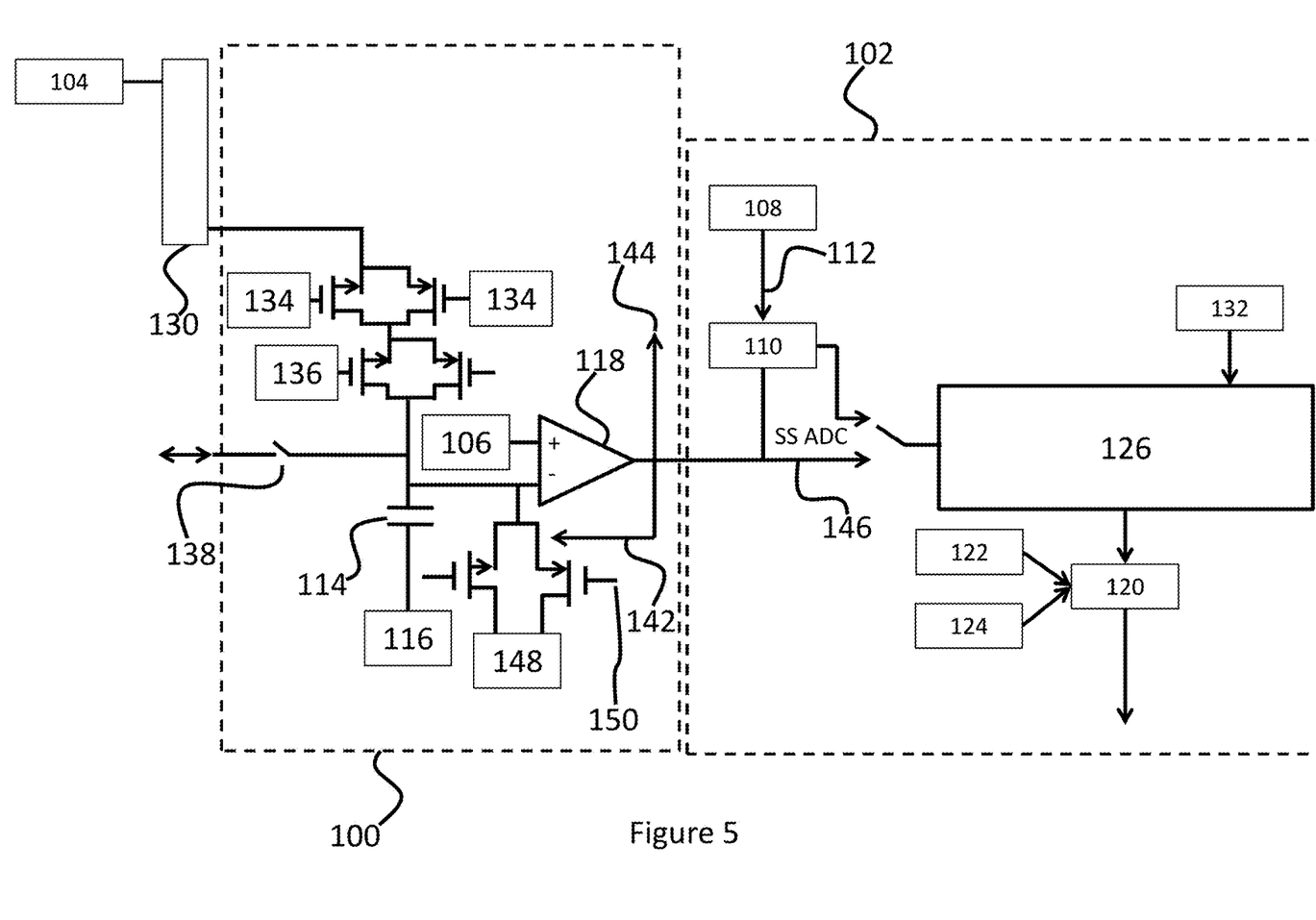
FIG. 5 is a schematic showing a pixel having bias selectable two-color photodetector, in accordance with embodiments of the present disclosure

Now referring to FIG. 5, FIG. 5 shows an ROIC (100/102) with analog 100 and digital 102 portions thereof highlighted, in accordance with embodiments of the present disclosure. FIG. 5 is designed for bias selectable detectors, in embodiments photodetectors 130, which have only one detector connection to the ROIC (100/102) per pixel. This figure is substantially identical to FIG. 2 except that it does not include a switch 140 for selecting between two inputs for simultaneous detectors 140. The circuit of FIG. 2 can be used to implement the circuit of FIG. 5 by setting the switch 140 to one input only. This embodiment shows an ROIC analog pixel 100 portion and an ROIC digital pixel 102 portion. The ROIC (100/102) includes a photodetector 130 having one input thereto, a detector common 104, a binning selection switch 138, a readout integration capacitor 114, a comparator 118 with threshold voltage input 106, a voltage reference or ramp 116, an enable count latch 110, a global clock 108, a readout connection 112, a latch module 120 connected to a counter/latch 126, the latch module 120 having a select latch write 122 and select latch read 124 connected thereto, a counter reset 132, two integration bias transistors that are part of a bi-directional two color input circuit 134, a stop integration switch for residue conversion 136, an automatic reset 142, an event detect 144, a counter clock 146, a reset reference voltage 148 or ADC conversion reference 148 (in embodiments, an event reference 148), and a global reset clock 150 or event bias 150.

Figure 6:
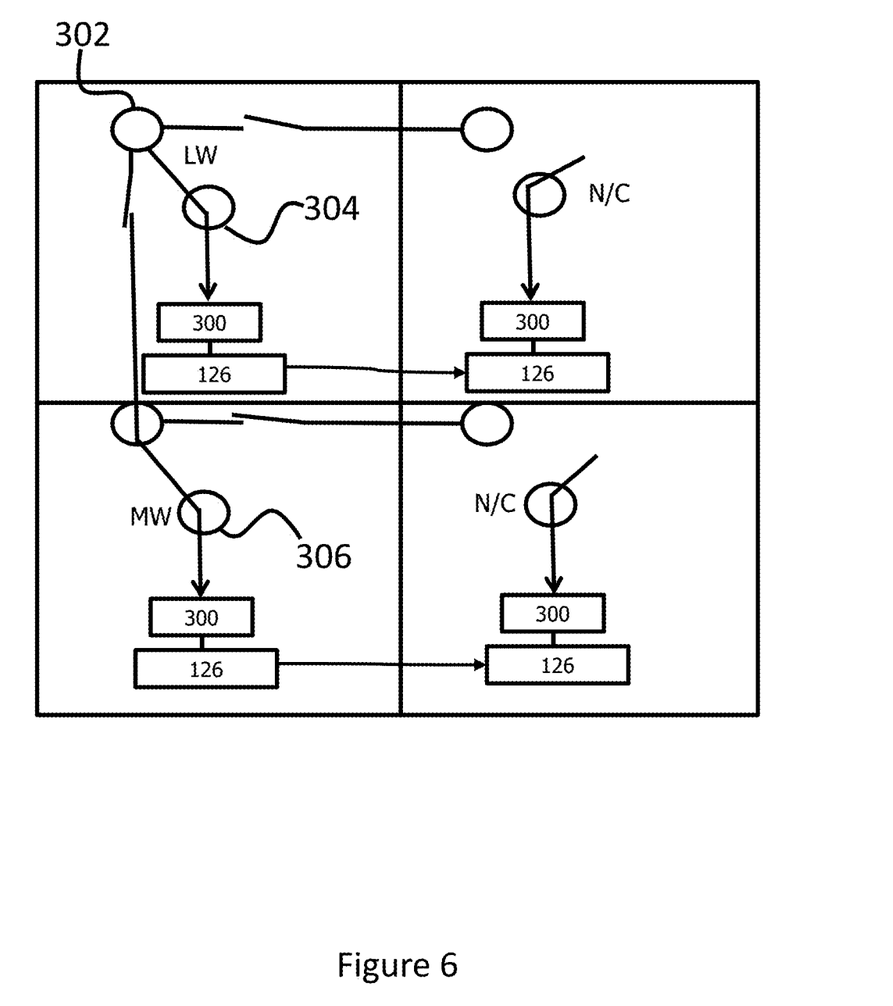
FIG. 6 is a top view of a 2×2 binned pixel configured for two color operation, in accordance with embodiments of the present disclosure.

Now referring to FIG. 6, a top view of a 2×2 binned pixel configured for bias-selectable, two-color operation where individual pixels have the structure shown in the schematic of FIG. 5 are provided. Since these detectors have only one connection, there is only one set of binning switches needed in the 2×2 configuration. However, two ROIC inputs 304 are, in embodiments, still used as before to integrate the two colors separately, synchronizing the ROIC input 304 switching and bias with the detector biasing.

Figure 7:
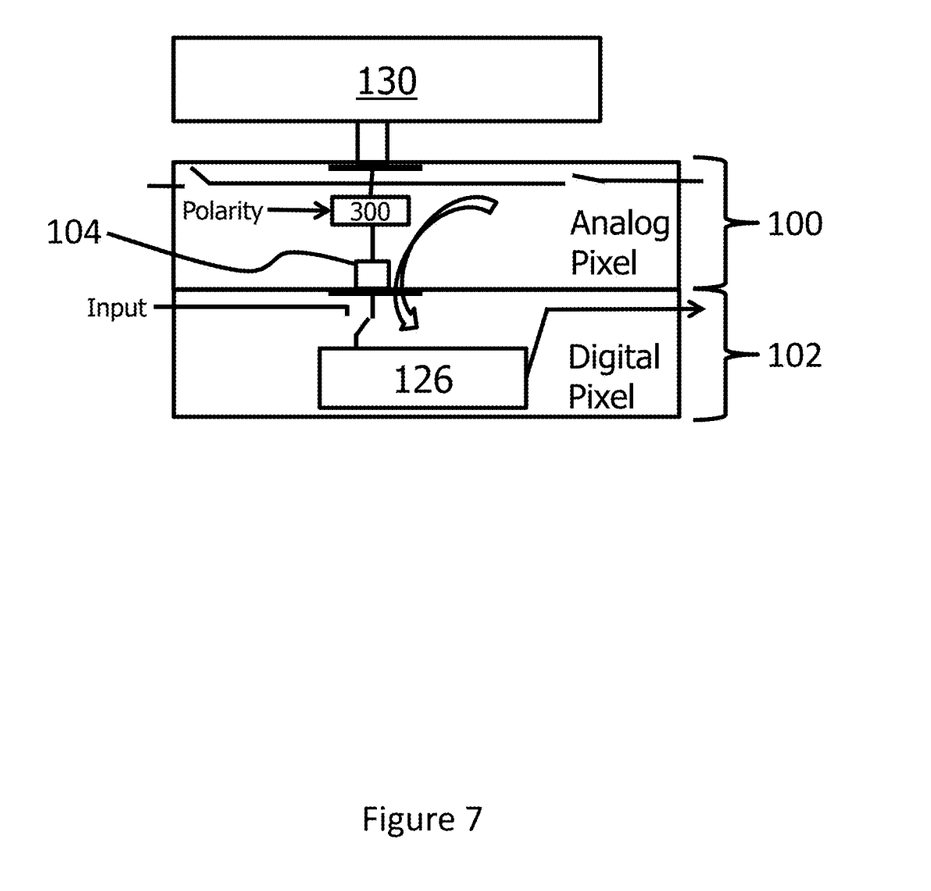
FIG. 7 is a cross sectional view of a pixel comprising a bias selectable two color photodetector, in accordance with embodiments of the present disclosure.

FIG. 7 shows a cross section of the bias selectable detector configuration of FIG. 5, where it is implemented in a stacked wafer configuration comparable to FIG. 4. It is identical to FIG. 4 except that there is only one detector connection and switch 140 has been removed.

In embodiments, the photodetector 130 is a bias-selectable, two-color photodetector 130.

In embodiments, the latch module 120 comprises SRAM.

In embodiments, the direct injection integration bias transistors that form the bi-directional, two color input circuit 134 are one NFET and one PFET, allowing for integrating detector currents of either polarity. For embodiments utilizing bias-selectable, two-color photodetectors 130 that have a single connection per pixel, the biasing of these input transistors and a Detector Common (DCOM) voltage sets the photodetector 130 bias and therefore which color is detected. The bi-directional input also allows use of either voltage polarity of single color detectors, since most photodetectors 130 require a specific polarity of bias and they are not all the same.

As used herein, DCOM voltage should be understood to refer to a bias voltage connected to the detector array. In embodiments, one side of all the detectors is connected to DCOM using internal detector array connections. In such embodiments, the other side of each pixel's detector goes to an ROIC input circuit. In embodiments, DCOM is generated by an ROIC while, in other embodiments, it is externally supplied. In embodiments, the DCOM voltage depends on the detector polarity, changing every time the detector polarity changes.

In embodiments, the latch module 120 contains latches with twice the number of bits as the counter 126, since the counter 126 is used twice during analog to digital conversion, in embodiments. In such embodiments, the counter 126 is used first for coarse conversion, counting resets. It is then used a second time in the integration residue single slope conversion, where its count is synchronized to an external ramp such that the comparator output latches the count when the ramp matches the integration voltage. The number of latches in such embodiments is equal to the number of detector pixels.

In embodiments, one ROIC (100/102) reads out all photodetectors 130 of one color and another ROIC (100/102) in the same bin group, which may be a 2×2 bin group, is used for the other color. In such embodiments, no additional latches are needed, compared to full-resolution, single-color operation. In fact, in such embodiments, only half of the ROICs (100/102) in a given pixel grouping are active at any given time.

In embodiments, many components in the ROICs (100/102) of a given pixel grouping, as shown in FIGS. 2-7, are shared between a group or groups of photodetectors 130. In such embodiments, a binning selection switch 138 is used to allow multiple detectors to integrate in one ROIC (100/102), which is commonly referred to as binning. The other ROICs (100/102) associated with the binned detectors can be unused or used for other functions.

In embodiments, relatively high resolution data captured at relatively high frame rates is summed to generate higher sensitivity data at a desired, lower frame rate, allowing higher frequency FPA data to be acquired to support threat warning.

In embodiments, high dynamic range, binned data is used to resolve counter 126 data ambiguity, which is especially important for bright scenes, if the counter 126 rolls over in lower dynamic range, full resolution mode.

In embodiments, high resolution, single-color data is binned to generate one color data at binned resolution at full FPA frame rate, while another color is available at half that rate from the frames binned in the FPA.

In embodiments, simultaneous, two-color binning provides simultaneous two-color operation when there is only one ROIC integrator per full resolution detector. In embodiments, this is accomplished by using two binned pixels' ROICs to support simultaneous two color integration.

In embodiments, binning is used to provide higher dynamic range. In embodiments, this is accomplished by using more than one ROIC per binned detector grouping.

In embodiments, two counters 126 are combined into one large counter 126 to support higher dynamic range counting. This provides a much larger increase in dynamic range compared to the previous practice of combining capacitors, since counters 126 multiply the two ranges while capacitors only add them together.

In embodiments, more than one separate integration is conducted in the binned area.

In embodiments, 2×2 binning is implemented and all 4 detectors of each color are binned to one ROIC input 304. For bias-selectable photodetector 130 embodiments, MW 306 and LW 302 ROIC inputs 304 are set to different polarities and two bin inputs shorted.

In embodiments, one ROIC (100/102) of a 2×2 binned group integrates charge from 4 detectors, with every other row not being used. In embodiments, these "inactive row" digital pixels are used to increase the coarse count range.

Now referring to FIGS. 8-11, these figures provide a graphical depiction of a pseudo-simultaneous, two-color integration in bin mode where four interleaved subframes are used, in accordance with embodiments of the present disclosure; a graphical depiction of timing when embodiments in accordance with the present disclosure are set to operate in a 2k×2k one color and binned 1k×1k pseudo simultaneous two color operation; a graphical depiction of timing when embodiments in accordance with the present disclosure are set to operate in a 2k×2k one color and binned 1k×1k simultaneous two color operation; and a chart describing various modes in which embodiments in accordance with the present disclosure may be operated, respectively.

Figure 8:
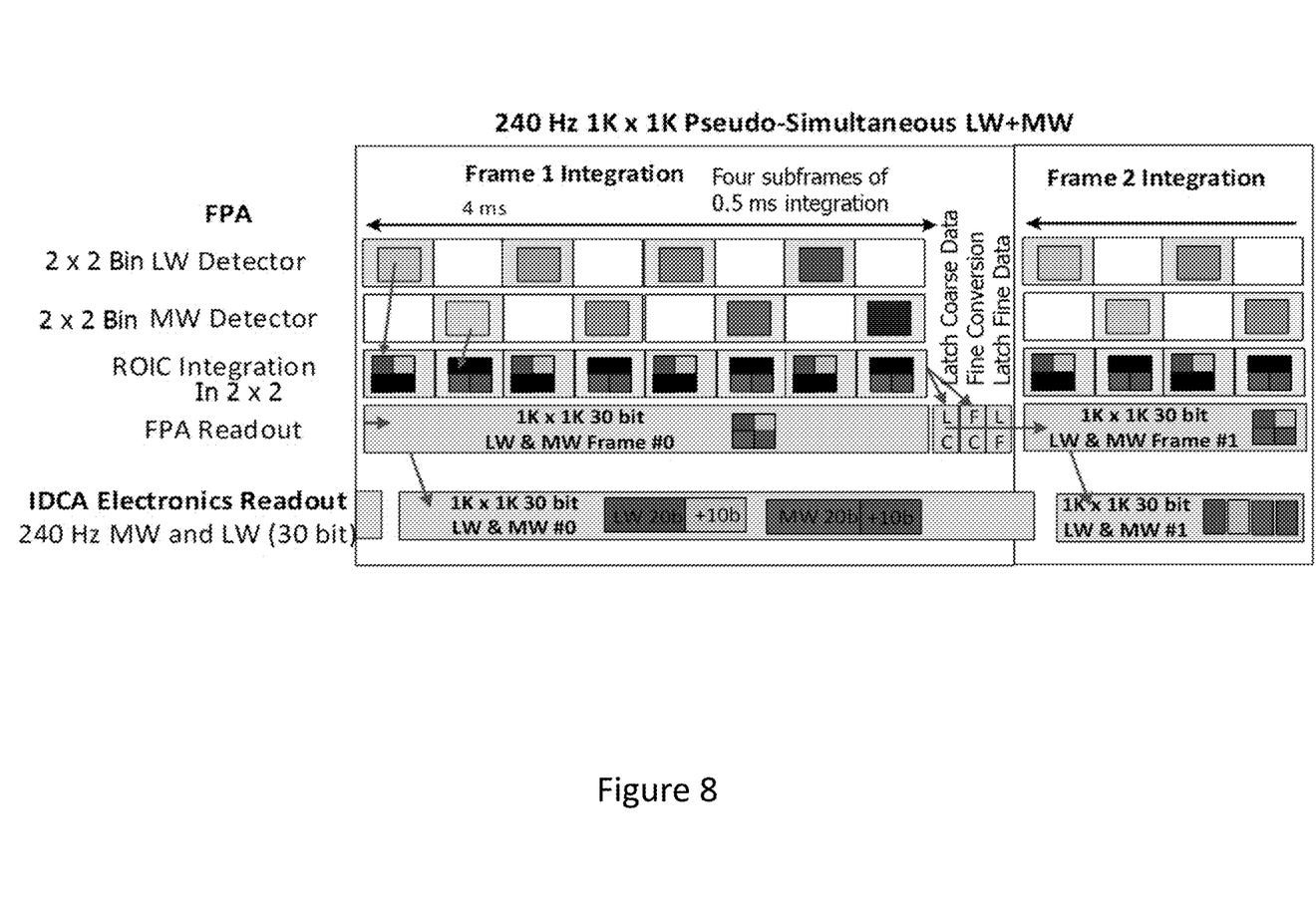
FIG. 8 is a graphical depiction of a pseudo-simultaneous, two color integration in bin mode where four interleaved subframes are used, in accordance with embodiments of the present disclosure.

More specifically, FIG. 8 illustrates pseudo-simultaneous two-color integration in a 2×2 binning mode, describing what different parts of the pixels, including ROICs (100/102) are doing in time throughout a frame. The box outlines the period of one frame while smaller boxes contained therein indicate the same functionality during a subframe integration period, the time when the ROIC (100/102) is integrating a selected color. There are four subframes in the figure, each subframe containing some LW and MW integration. The ROIC (100/102), in embodiments, will sum the outputs of all four subframes in a frame to get the integration for the entire frame, which is what is read out from the pixel.

The interleaving of the subframes means that the integration of the two colors takes place over the same time period, but not at exactly the same time, which is herein referred to as pseudo-simultaneous. If the subframe time is faster than the any expected changes in the scene, then this configuration provides equivalent performance to true simultaneous integration in being able to correlate the two colors as representative of the same scene.

The first line of red boxes, "2×2 Bin LW Detector", indicates operation of the detectors in an LW bias and sensing mode. Within each of the subframe interval boxes is another box, colored a deeper shade of red. This box illustrates functionality within the 2×2 bin group. For this diagram, the detectors are all binned, so it is a single box. The color gets darker in successive subframe to illustrate that the ROIC (100/102) is accumulating signals from the successive subframes in one integration capacitor.

The second line, "2×2 MW Detector", is similar to the first LW lines, but the subframe integration times of the two colors alternate within each subframe. Since this figure describes a bias-selectable detector, the detector can integrate either LW or MW, but not both.

The third ROIC (100/102) line illustrates the different operation of the ROIC (100/102) using different color codes. More specifically, the upper left quadrant is red, to indicate that it is integrating LW, or black to indicate that it is not doing anything at that time. The lower left quadrant is blue to indicate MW integration or black to indicate that it is doing nothing. The upper right quadrant is yellow, to indicate that its digital counter and latch circuits are being used to extend the dynamic range of the upper left pixel. The lower right quadrant is purple, to indicate that it's digital counter and latch are being used to extend the dynamic range of the lower right MW pixel's integration. During the subframe times where this line is colored in, the LW detector is supplying detector current to the upper left ROIC pixel, which is also colored red in the third line, "ROIC Integration in 2×2". A red arrow during the first subframe indicates that the LW detector is supplying the current to the ROIC (100/102).

The fourth line indicates readout from the ROIC (100/102) to an Integrated Dewar Cooler Assembly (IDCA) electronics, used in embodiments. In embodiments, the data from a previous frame integration is read out during the next frame's integration time. In embodiments, after integration and readout are complete, the ROIC (100/102) latches the new coarse integration count, performs fine residue conversion, and then latches the fine residue count, placing that frame's data in a counter 126, in embodiments latches, ready to be read out. This includes both colors of data and the extended range data, so all four colors of the ROIC pixels are shown.

The fifth line, "IDCA Electronics" indicates when data would be output from external electronics (not part of the ROIC) to the system. In embodiments, there is a small delay, much less than a frame, from the output of the ROIC (100/102) to the output of the electronics. In this case, the colored boxes indicate the data coming from the different ROICs (100/102) within the 2×2. In embodiments, the integrating pixels contribute 20 bits, 10 bits of coarse counting and 10 bits of fine residue conversion. The extended range pixels add another 10 bits of coarse counting range, for a total of 20 bits of coarse counting range.

Figure 9:
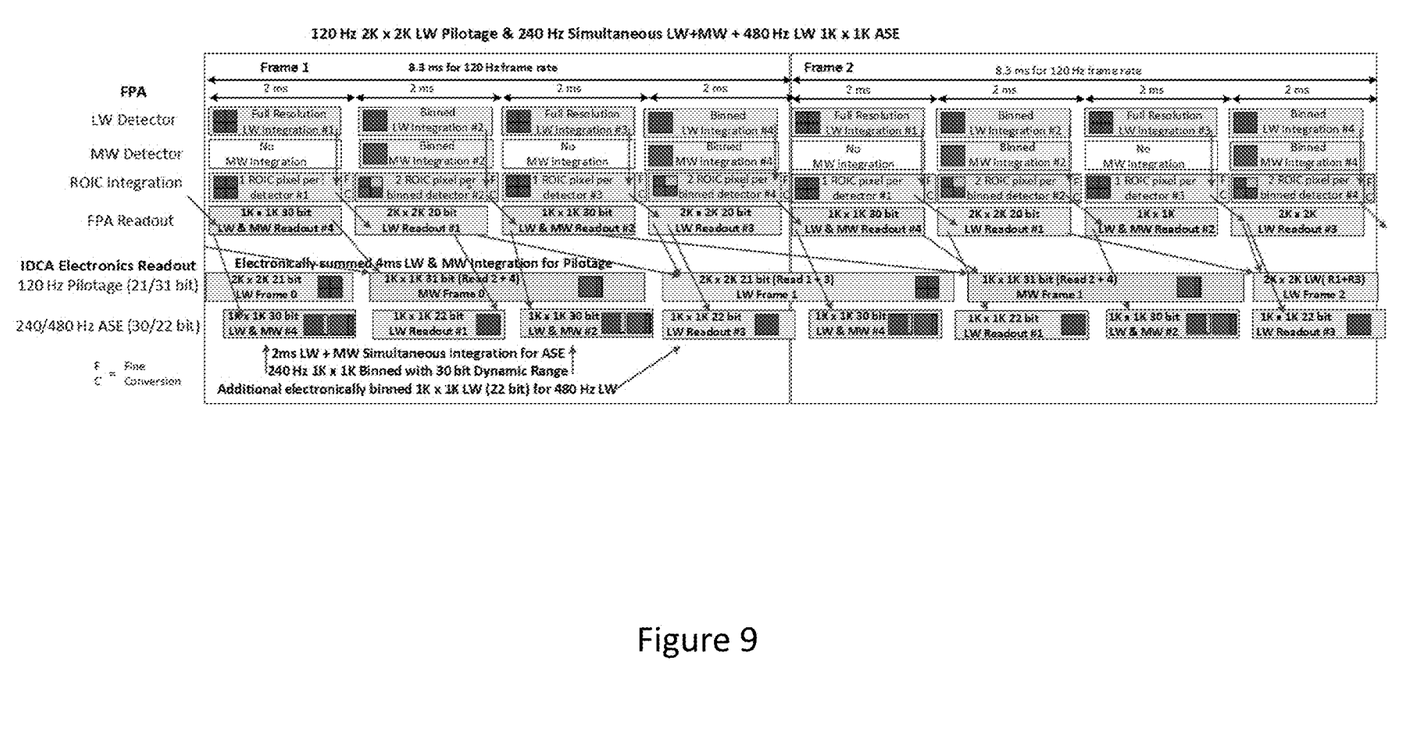
FIG. 9 is a graphical depiction of timing when embodiments in accordance with the present disclosure are set to operate in a 2k×2k one color and binned 1k×1k pseudo simultaneous two color operation.

Now referring to FIG. 9, this figure illustrates interleaving two different types of integration in a chart similar to that of FIG. 8. In this exemplary embodiment, there are four 2 ms integration periods in an 8.3 ms FPA frame, alternating between two different types of integration. After each 2 ms integration period is complete, the data is read out from the FPA to the IDCA electronics.

In embodiments, the first type of integration is full resolution, single color LW integration, a standard type of integration for an FPA. The IDCA electronics is summing the two 2 ms integration period outputs of the FPA in this mode and reading out data at the frame rate (120 Hz in FIG. 9). In an alternate mode of operation, it would not sum them, but read them out directly in a 2 ms period. To indicate that full resolution (not binned) integration is taking place, the red squares in the LW detector lines are divided into 2×2 boxes.

The second type of integration is binned simultaneous two color integration. This requires simultaneous, two color detectors with two outputs per pixel. In this mode the detectors of each color within the 2×2 bin group are connected together and connected to one ROIC input 304 as discussed previously and shown in FIG. 3. Because all of the 2×2 detectors are having their signals combined, the box in the LW and MW detectors lines are drawn as just one large box, instead of the 2×2 used for full resolution. Since this is a simultaneous detector with two outputs, LW and MW integration can take place at exactly the same time for the full 2 ms integration time. The same extended dynamic range from the other 2 ROIC digital circuits 102 can be used, as was discussed for the pseudo-simultaneous integration, so the ROIC squares have all 4 pixels colored in during integration. Another mode variant substitutes pseudo-simultaneous integration for simultaneous integration in this timing, but otherwise remains the same.

The four outputs per frame shown in the fourth line, "FPA Readout" are used by the IDCA electronics, which are shown in line 5, to generate output to two different system functions, pilotage and survivability. The pilotage function of embodiments uses full resolution in the LW band for the best overall representation of the scene for piloting the aircraft, but does not need updates faster than 120 Hz. The figure shows the two 2 ms integration readout being combined for the optimum sensitivity. Another option is reading out only the second of the two integration times for less scene blur and latency, which is herein referred to as "Fast Flight Mode". The lower resolution MW scene from the binned outputs is also used, in embodiments, to add more information for pilotage.

Regarding output for survivability, the priority becomes two simultaneous color information at high frame rates, preferably 480 Hz. Two simultaneous color information is available from the binned mode outputs and can be interleaved with the LW output information from the full resolution binned electronically to get 480 Hz LW output.

Figure 10:
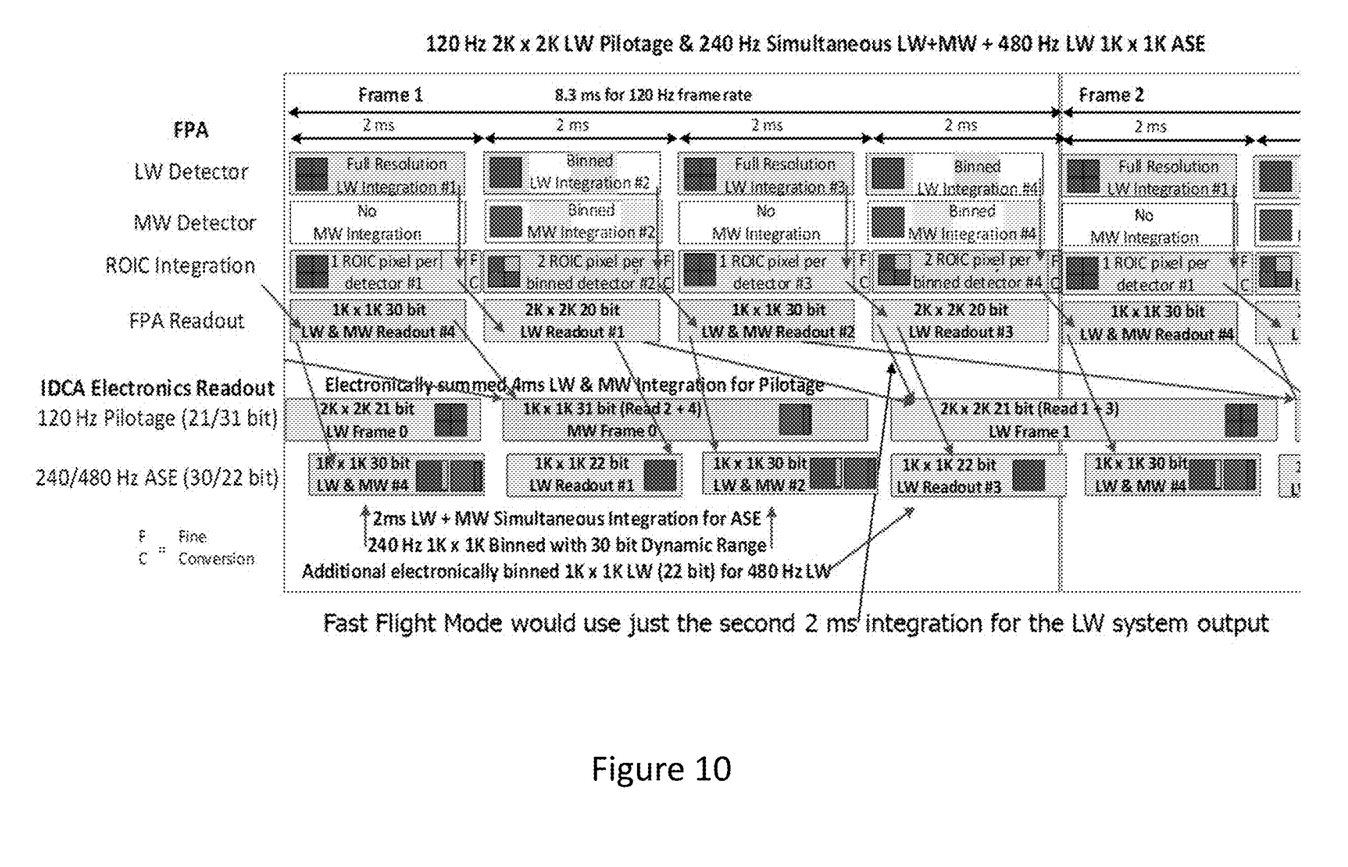
FIG. 10 is a graphical depiction of timing when embodiments in accordance with the present disclosure are set to operate in a 2k×2k one color and binned 1k×1k simultaneous two color operation.

Regarding FIG. 10, it is quite similar to FIG. 9, with the exception of the 2 ms simultaneous detectors and simultaneous integration times being replaced with bias selectable detectors and pseudo-simultaneous integration times, which was discussed previously in connection with FIG. 8. The pseudo-simultaneous operation is indicated by alternating colored and white blocks within the 2 ms integration for LW and MW. It can be seen that either the light red or light blue is there at any one time, indicating the bias selectable operation. The width and number of colored blocks is small simply to fit within the figure and not intended to specify or limit the number of subframes within the pseudo-simultaneous operation.

Figure 11:
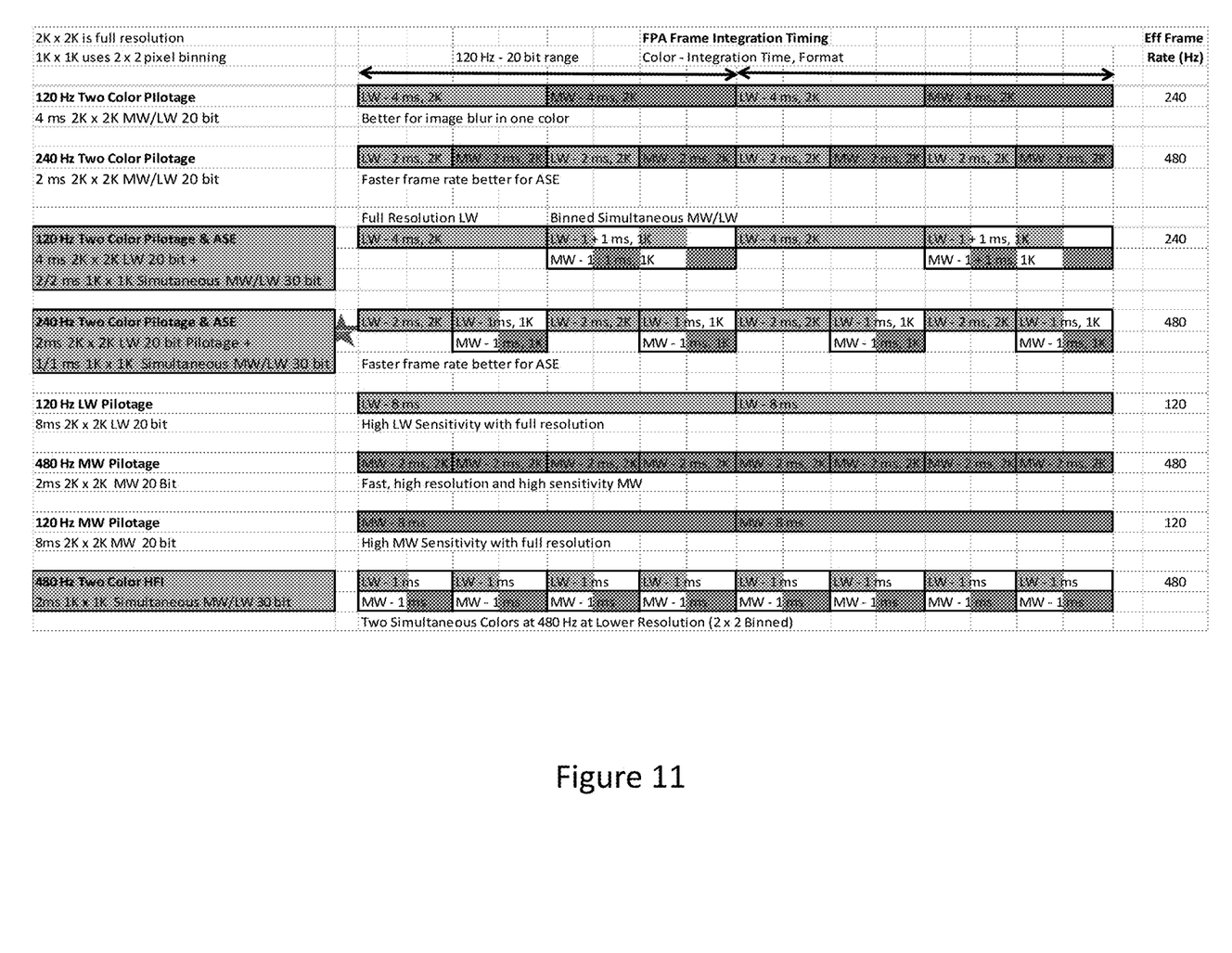
FIG. 11 is a chart describing various modes in which embodiments in accordance with the present disclosure may be operated.

FIG. 11 illustrates a number of different integration modes in which the ROIC (100/102) and pixel configuration shown in FIGS. 1-7 can operate with pseudo-simultaneous detectors. In embodiments, the ROIC (100/102) and pixel circuits of FIGS. 2-4 operates in the way shown in FIGS. 5-7 by having the bias-selectable detectors use one of the two simultaneous inputs. The first four lines illustrate interleaved modes and remaining four lines have only one mode of operation. This is not intended to show all possible modes, but to illustrate that this circuit architecture is very flexible and can implement a number of useful modes of operation that support multiple system missions from one FPA output. The first line in FIG. 11 alternates full resolution LW and MW integration using 4 ms integration and readout times. The second line alternates full resolution LW and MW integration using 2 ms integration and readout times to achieve full resolution, two color operation. The third line alternates LW-only and two color integration with 4 ms integration and readout times to give full resolution and simultaneous two color data. The fourth line alternates LW and two color integration with 2 ms integration and readout times for full resolution and simultaneous two color data at a higher frame rate. The fourth line corresponds to the same timing shown in FIG. 9, but shown simplified and with LW and MW not overlapping for the pseudo-simultaneous integration variant of the interleaved full resolution LW and binned two color operation. The fifth line shows LW-only 8 ms integration for maximum sensitivity without interleaving; all outputs are the same integration. The sixth line shows a MW-only 2 ms integration for fast frame rate with high MW sensitivity. The seventh line shows MW-only 8 ms integration for maximum sensitivity. The last and eighth line shows operation in two color pseudo-simultaneous integration, which is the same as FIG. 8 illustrates in more detail.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A system for providing high resolution image output for pilotage and two color operation for threat detection, the system comprising:
    a focal plane array, said focal plan array comprising:
    a plurality of pixels, wherein said pixels are arranged into groups of equal numbers of pixels, each pixel comprising:
        at least two detectors configured to receive electromagnetic energy; and
        a readout integrated circuit comprising an analog portion and a digital portion, which combine to form a current to frequency conversion circuit configured to convert current received from one of the at least two detectors into a pulse train, and a counter in operative communication with said frequency conversion circuit configured to count pulses in the pulse train during an integration time,
    wherein each detector from each of the pixels in a group of pixels is configured such that it can be connected to or disconnected from at least one detector from each adjacent pixel in a row or column from the same said group of pixels, and
    wherein each group of pixels is configured such that an output from detectors connected to one another is directed through the readout integrated circuit of a single pixel from the group of pixels.

2. The imaging apparatus of claim 1 wherein each of the two detectors present in a given pixel is configured to detect electromagnetic energy from different portions of the electromagnetic spectrum.

3. The system of claim 2 wherein each detector from each of the pixels in a group of pixels is configured such that it can be connected to or disconnected from at least one detector from each adjacent pixel that is configured to detect electromagnetic energy from the same portion of the electromagnetic spectrum in a row or column from the same said group of pixels.

4. The system of claim 1 wherein the current to frequency conversion circuit comprises a bidirectional input with auto-reset or event detection.

5. The imaging apparatus of claim 1 wherein said readout integrated circuit is configured to perform a single slope conversion of a residue using the counter and to store counter data stored in latches for readout following the counting of pulses in the pulse train during an integration time.

6. The imaging apparatus of claim 1 wherein said readout integrated circuit is configured to perform in-pixel two-stage analog to digital conversion following the counting of pulses in the pulse train during an integration time.

7. The system of claim 1 wherein said photodetector is a bias-selectable, two-color photodetector or a simultaneous, two-color photodetector further comprising a select detector configured to allow parallel, two-color conversion in the readout integrated circuit.

8. The system of claim 1 wherein the readout integrated circuit further comprises at least two direct injection integration bias transistors and wherein the at least two direct injection integration bias transistors are one NFET and one PFET.

9. The imaging apparatus of claim 1 wherein the readout integrated circuit of each group of pixels further comprises:
    a binning selection switch connected between a first output of the photodetector and the digital portion of the readout integrated circuit;
    a readout integration capacitor configured to convert charge produced by the photodetector to a voltage, wherein the readout integration capacitor is in electrical communication with a VRSI reference or ramp;
    a comparator with two inputs, a threshold voltage input and a second input in electrical communication with the readout integration capacitor;
    an enable count latch in electrical communication with an output of the comparator and in further electrical communication with a clock that itself is in switched electrical communication with a counter or latch via a readout connection, the enable count latch also being in switched electrical communication with the counter or latch;
    a latch module connected to the counter or latch;
    a select latch write in operative communication with the latch module;
    a select latch read in operative communication with the latch module;
    a counter reset in operative communication with the counter or latch;
    at least two direct injection integration bias transistors disposed between the comparator and the photodetector;
    a stop integration switch configured for residue conversion and disposed between the comparator and the photodetector;
    an event detect connected to the comparator output;
    and a reset clock or event bias disposed between the comparator output and the second input of the comparator.

10. The system of claim 9 wherein the latch is configured to allow one counter to be shared among a group of pixels and to store coarse count data corresponding to a previously-captured subframe from at least one photodetector while a different photodetector is using the counter to count a subframe in the process of being captured and then, for each photodetector, to load a counter value stored in the latch for that detector and the count data for the next detector from previous subframes to continue the integration for that detector in the next subframe.

11. The system of claim 1 wherein binned data is used to resolve counter ambiguities.

12. The system of claim 1 wherein the system is configured to output data from a first group of binned detectors at a first frame rate, while outputting data from a second group of binned detectors at a second frame rate.

13. The system of claim 1 wherein the system is configured to capture relatively high resolution data at relatively high frame rates and to then sum that data to generate higher sensitivity data at a desired, lower frame rate.

14. An imaging sensor, the imaging sensor comprising:
an array of detectors configured to toggle rapidly between two different modes of operation, a single color mode using all individual detectors for full resolution and a two color mode using binned 2×2 groups of detectors, wherein the two color mode utilizes bias-selectable two color detectors that integrate two different colors based on a detector bias polarity, and wherein the output of the two color mode is composed of interleaved subframes of two different colors and each color output in a frame is composed of a sum of subframe integrations for that color in one frame; and
at least one output configured to output images generated by each mode of operation.

15. The image sensor of claim 14 wherein each mode uses a separate detector and the output of each detector is output over the at least one output simultaneously.

16. The image sensor of claim 14 wherein the array of detectors is disposed on two bonded silicon layers, a top analog layer and a bottom digital layer.

17. The image sensor of claim 14 wherein the imaging sensor comprises a plurality of high dynamic range pixels, each of the plurality of high dynamic range pixels comprising an analog to digital converter.

18. The image sensor of claim 17 wherein each said pixel is configured to carry out an in-pixel two stage analog to digital conversion, using automatic reset counting for coarse integration and single slope residue conversion for fine conversion.

19. The image sensor of claim 18 wherein an in-pixel counter is used for both coarse and fine conversion and wherein data from the in-pixel counter is saved in separate latches in the pixels.

* * * * *